3,151,992
FIRE RETARDANT BITUMINOUS COMPOSITIONS

Noel D. Blair, Tonawanda, and Claude Thomas Bean, Jr., Niagara Falls, N.Y., assignors to Hooker Chemical Corporation, Niagara Falls, N.Y., a corporation of New York
No Drawing. Filed Jan. 30, 1961, Ser. No. 85,498
8 Claims. (Cl. 106—15)

This invention relates to novel fire retardant bituminous compositions, and to methods for rendering bituminous materials fire retardant.

Bituminous materials find numerous commercial applications. They are used in various roofing materials, for example, asphalt shingles and in built-up roofs. Further uses are in coated or impregnated papers, floor tile and for protective coatings, emulsions and paints, for example, for coating outdoor wooden structures.

These and other uses are better served by bituminous compositions that are fire retardant and flame resistant. Accordingly, it is an object of this invention to provide fire retardant bituminous compositions. It is a further object of this invention to provide methods for reducing the flammability of bituminous materials to the non-burning state.

These and other objects are accomplished by providing bituminous compositions comprising a bituminous material and a compound selected from the group consisting of $C_{10}Cl_{12}$, $C_{10}Cl_4F_8$, $C_{10}Cl_{10}O$, $C_{10}H_2O_3SCl_{12}$ and mixtures thereof. The flame retardant characteristics of these bituminous compositions is further improved by incorporating antimony compounds therein.

Many types of bituminous materials are commercially available, ranging from those derived from petroleum (asphaltic products), to those derived from coal tar. The asphaltic products include native asphalts, residual asphalts, blown petroleum asphalts precipitated by propane, fatty-acid pitches, and asphalts modified with oils such as linseed oil, cotton seed oil, castor oil, vegetable oils and animal oils, and various mixtures thereof. The tar products include the pitch obtained by distilling the highly volatile oils from coal tar as well as combinations thereof with oil gas tar and water-gas tar. These materials are provided in the form of semi-liquids to semi-solids where they are to be used for impregnating felted or woven fabrics in roofing and insulating compositions. The same groups of substances are commonly prepared with a harder consistency and also with a higher fusing-point. The latter materials are primarily used for coating or adhesive compositions. The foregoing list of bituminous materials is set forth to provide a better understanding of the type of material contemplated by the term "bituminous material." These and other bituminous materials are useful in the present invention.

The halogenated compounds of the present invention are desirably incorporated in the bituminous materials in an amount to provide from about ten to about fifty weight percent halogen in the bituminous composition, and preferably ten to thirty percent by weight. Improved fire retardance can be provided by incorporating antimony compounds in the bituminous composition in the amount of about one to about ten percent by weight of said composition, preferably five percent.

The preparation of $C_{10}Cl_{12}$, a white, crystalline solid, is disclosed in U.S. 2,724,730. The compound, a dimer of hexachlorocyclopentadiene, is prepared by reacting hexachlorocyclopentadiene in the presence of aluminum chloride. If desired, a solvent reaction medium such as hexachlorobutadiene, carbon disulfide, petroleum ether, perchloroethylene or carbon tetrachloride may be used. The reaction mixture is heated to a temperature in the range between about forty degrees centigrade and the reflux temperature of said mixture, preferably between about sixty-five degrees and two hundred and thirty-five degrees centigrade, under the vapor pressure of the mixture at the temperature employed. The reaction product is water-washed at room temperature to effect the removal of aluminum chloride and the organic layer is dried with anhydrous sodium sulfate. The product may be further purified by distillation, followed by recrystallization from benzene to produce white crystals.

$C_{10}Cl_4F_8$ is a colorless, crystalline solid having a melting point of about seventy-four to seventy-five degrees centigrade. The preparation of the compound is disclosed in U.S. 2,951,097. The compound is prepared by coupling 1,2,3,3 - tetrachlorotetrafluorocyclopentene with itself in the presence of copper, while heating at the reflux temperature of the reaction mixture. A reaction diluent such as toluene, monochlorobenzene, hexachlorobutadiene or the reactant itself may be used. The optimum reaction temperature is from about one hundred to two hundred and fifty degrees centigrade. The product may be isolated from the reaction mixture by filtration of the mixture to remove the copper chloride by-product, followed by distillation to remove the diluent and unreacted starting materials.

The preparation of $C_{10}Cl_{10}O$ is disclosed in U.S. 2,616,928. Hexachlorocyclopentadiene and sulfur trioxide are mixed and digested for a short period to condense two molecules of hexachlorocyclopentadiene and to form a liquid reaction product of hexachlorocyclopentadiene and sulfur trioxide. The reaction product is then hydrolyzed with an alkaline aqueous medium, after which the mixture is neutralized with sulfuric acid, whereupon the crystalline product precipitates. The reaction mixture is cooled to insure relatively complete precipitation of the product which is then separated from the mixture by filtration or centrifugation.

$C_{10}Cl_{10}O$ is also prepared by treating $C_{10}H_2O_3SCl_{12}$ with alcoholic alkali, followed by acidification.

$$C_{10}H_2O_3SCl_{12}$$

is prepared by reacting hexachlorocyclopentadiene with chlorosulfonic acid at a temperature in the range of thirty to one hundred and seventy degrees centigrade as disclosed in U.S. 2,516,404.

An indirect method for incorporating $C_{10}Cl_{10}O$ into bituminous materials is to mix $C_{10}H_2O_3SCl_{12}$ into the bituminous material. At the elevated temperatures required for mixing, at least a major portion of the $C_{10}H_2O_3SCl_{12}$ decomposes to form $C_{10}Cl_{10}O$.

Antimony oxide is the antimony compound that is presently preferred for use in the present invention. However, many antimony compounds are suitable. Inorganic antimony compounds include antimony sulfide, sodium antimonite, potassium antimonate, and the like. Many organic antimony compounds are suitable such as the antimony salts of organic acids and their pentavalent derivatives disclosed in copending application SN 688,143, filed October 4, 1957, now U.S. Patent 2,996,528. Compounds of this class include antimony butyrate, antimony valerate, antimony caproate, antimony heptylate, antimony caprylate, antimony pelargonate, antimony caprate, antimony cinnamate, antimony anisate and their pentavalent dihalide derivatives. Likewise the esters of antimonous acids and their pentavalent derivatives disclosed in copending application SN 688,108, filed October 4, 1957, now U.S. Patent 2,993,924, such as tris(n-octyl) antimonite, tris(2-ethylhexyl) antimonite, tribenzyl antimonite, tris($\beta$-chloroethyl) antimonite, tris($\beta$-chloropropyl) antimonite, tris($\beta$-chlorobutyl) antimonite and their pentavalent dihalide derivatives. Still other suitable organic antimony compounds are the cyclic antimonites such as trimethylolpropane antimonite, pentaerythritol antimonite, and glycerol antimonite.

Several embodiments of our invention are set forth in the following examples. The examples are not to be construed as limiting the scope of the invention.

In these examples, tests were preformed to determine the relative flammability of coated felt strips. All tests were carried out in a sheet metal test shield having inside dimensions twelve inches in width by twelve inches in depth by thirty inches in height and open at the top. The shield had a viewing window in one side, of sufficient size and in such a position that the entire length of the specimen under test could be observed. This viewing side was hinged so that the shield could be readily opened and closed to facilitate the mounting and ignition of the test specimen. Test specimens were clamped vertically, edgewise, using a spring type paper clamp. The clamp was then attached rigidly to the shield and centered. A laboratory burner was adjusted to provide a flame of about one inch in total height and applied to the end of the specimen until it ignited but not longer than fifteen seconds. If the specimen ignited on one attempt and continued to burn, the result was judged to be "burning" by this test. If the specimen did not ignite or was self extinguishing upon the first attempt additional fifteen second flame applications were made until the specimen ignited. The number of ignitions were noted. A specimen which did not ignite in one attempt was judged to be "non-burning" by this test. All tests were run in duplicate in a hood with the exhaust fan turned off.

EXAMPLE 1

An untreated asphalt coating was prepared on a saturated asphalt film strip by pouring a heated asphalt coating material on the top surface of the felt. A heated iron was applied to give a uniform armour thickness of one-sixteenth of an inch. The specimen was then cut to give a final coated strip of two inches by twelve inches and used in the aforementioned flame test. The flame test showed that the test strip burned readily with excessive dripping of the asphalt coating.

EXAMPLE 2

The procedure of Example 1 was repeated using a "stabilized" coating asphalt containing one part of calcium carbonate per part of asphalt. The flame test likewise showed the strip to be flammable and produced excessive dripping.

In Examples 3 through 10, various quantities of $C_{10}Cl_{12}$ (hexachlorocyclopentadiene dimer) were incorporated in the stabilized and unstabilized asphalts used in Examples 1 and 2 by heating the asphalt to four hundred degrees Fahrenheit and adding the $C_{10}Cl_{12}$ with stirring. The testing procedure used in Example 1 was followed. As indicated in the following table, the flame test data on the test strips showed that the asphalt coatings containing up to five percent chlorine were flammable and resulted in excessive dripping. The coating compositions containing ten percent chlorine and greater, were non-burning, and dripping of the coating was reduced as the chlorine content increased.

Table I

| Example | $C_{10}Cl_{12}$, Wt. percent | $Cl_2$, Wt. percent | Number of ignitions | Flammability | Remarks |
|---|---|---|---|---|---|
| 3 | 3.2 | 2.5 | 1 | Burning | Excessive dripping. |
| 4 | 6.4 | 5.0 | 1 | ____do____ | Do. |
| 5 | 12.8 | 10.0 | 1-2 | Non-Burning | Do. |
| 6 | 25.6 | 20.0 | 4 | ____do____ | Moderate dripping. |
| 7 | 38.5 | 30.0 | 4 | ____do____ | Slight dripping. |
| 8 | 12.8 | 10.0 | 1-2 | ____do____ | Excessive dripping, first test was self-extinguishing. |
| 9 | 25.6 | 20.0 | 1-4 | ____do____ | Slight dripping, first three tests were self-extinguishing. |
| 10 | 38.5 | 30.0 | 3-5 | ____do____ | Very slight dripping, intumescent. |

Note.—Unstabilized asphalt used in Examples 3 to 7; stabilized asphalt in Examples 8 to 10.

In Examples 11 through 19, antimony oxide was used in the asphalt compositions. The test strips were prepared in accordance with Example 1 and were tested as before except as noted in Tables II and III.

Table II

| Example | $C_{10}Cl_{12}$, Wt. percent | $Sb_2O_3$, Wt. percent | Chlorinated Paraffin, Wt. percent | $Cl_2$, Wt. percent | Flammability | Remarks |
|---|---|---|---|---|---|---|
| 11 a | None | 5.0 | | None | Burning | Excessive dripping. |
| 12 | 12.8 | 5.0 | | 10.0 | Non-Burning | Slight dripping. |
| 13 | 25.6 | 5.0 | | 20.0 | ____do____ | Do. |
| 14 | 12.8 | 5.0 | | 10.0 | ____do____ | Moderate dripping, intumescent. |
| 15 | 25.6 | 5.0 | | 20.0 | ____do____ | Very slight dripping, intumescent. |
| 16 a | None | 5.0 | b 30.0 | 21.0 | Could not be tested. | Decomposed upon heating to 200° C. |
| 17 a | None | 5.0 | c 30.0 | 12.0 | ____do____ | Coating slipped off felt at room temperature. | a In these tests only one ignition attempt was made; the test samples were three-quarters of an inch by six inches.
b "Chlorowax 70" (trademark of Diamond Alkali Company).
c "Chlorowax 40" (trademark of Diamond Alkali Company).
Note.—Unstabilized asphalt used in Examples 11, 12, 13, 16, 17; stabilized asphalt in Examples 14 and 15.

The flame test data in Table II indicates that the compositions containing $C_{10}Cl_{12}$ were non-burning, dripping of the coating was minimized, and an intumescent effect was observed when antimony oxide was included in the coating composition.

Addition of antimony trioxide effectively reduced the amount of chlorine necessary to render these coatings non-burning. At both the ten and twenty percent chlorine levels with antimony oxide, the stabilized asphalt coating was self-extinguishing, even though the combustible substrate burned.

By comparison it was found that the use of thirty percent of chlorinated paraffin wax was ineffective in that the coatings were so unstable that the flammability test could not be run.

In the following Examples 18 and 19, non-burning asphalt coatings were prepared in accordance with Example 1 using other halogenated compounds, in sufficient amounts to provide at least ten weight percent halogen based on the weight of the composition.

Table III

| Example | Compound | Compound, Wt. Percent | Sb$_2$O$_3$, Wt. Percent | Halogen, Wt. Percent | Flammability |
|---|---|---|---|---|---|
| 18 a | C$_{10}$Cl$_{10}$O | 30.0 | 5.0 | 21.7 | Non-Burning. |
| 19 a | C$_{10}$Cl$_4$F$_8$ | 30.0 | 5.0 | 21.3 | Do. | a Same as in Table II.

NOTE.—Unstabilized asphalt used in Examples 18 and 19.

In the manner of the foregoing examples, the incorporation of C$_{10}$H$_2$O$_3$SCl$_{12}$ and the compound C$_{10}$Cl$_{12}$, having a melting point of about two hundred and twenty-two degrees centigrade and disclosed in U.S. 2,849,499, imparts fire retardance to bituminous materials.

In the foregoing examples, it is evident that not only are the compositions of the instant invention fire resistant, but also as the halogen content of the coatings is increased the dripping tendency of the coating decreases and intumescence is observed. Herein lies the great advantage over prior art methods for fire-proofing bituminous compositions. The presence of our halogenated compounds in bituminous coatings maintains the viscosity of these coatings high even at elevated temperatures. By contrast, conventional bituminous compositions drip and run in contact with flames, thereby increasing the fire-hazard by spreading the hot melt over the environment.

The temperature of mixing the components of the invention is not critical, ranging from the temperature at which the bituminous material becomes fluid, up to the decomposition temperature of said bituminous material.

The "stabilized" asphalt used in the examples contained calcium carbonate. It is also within the scope of the present invention to use other powdered or fibrous fillers, pigments, etc., that are commonly used in the art. Such substances may be either inorganic or organic in origin and are used for reducing the cost of the finished product, to impart weather resistance or to impart color to surface coatings. Commonly used additives include silica, limestone, slate dust, clay, asbestos fibers, and black and colored pigments. Various halogenated wax products may also be incorporated in the compositions of the invention.

The bituminous compositions of this invention find many commercial applications. They may be used for saturating felts that are subsequently used as an intermediate product in the manufacture of prepared roofings and composition shingles, for constructing "built-up" roofs, for the manufacture of bituminized floor coverings, for waterproofing membranes such as tarpaulins, and other applications in which bituminous saturated felts are commonly used. Our bituminous compositions may be used in many coating applications such as in the manufacture of shingles, siding for home construction wrapping and packing paper, electrical transmission insulation, cords and ropes, bituminized wall board, insulating board and the like, bituminous pipe, and asphalt mastic roofs. Other applications include bituminous lacquers and cements. In all such applications the industrial requirements are becoming more and more stringent regarding the use of fire retardant bituminous compositions. The compositions of our invention satisfy that fast growing need.

While we have described our invention with respect to certain embodiments, many other variations that will be apparent to those skilled in the art are considered to fall in the scope of this invention. Having thus described our invention, we claim:

1. A fire retardant bituminous composition comprising a bituminous material and a compound selected from the group consisting of C$_{10}$Cl$_{12}$, C$_{10}$Cl$_4$F$_8$, C$_{10}$Cl$_{10}$O, C$_{10}$H$_2$O$_3$SCl$_{12}$ and mixtures thereof in sufficient proportion to improve the fire retardancy of the bituminous material.

2. A fire retardant bituminous composition comprising a bituminous material, a compound selected from the group consisting of C$_{10}$Cl$_{12}$, C$_{10}$Cl$_{10}$O, C$_{10}$Cl$_4$F$_8$, C$_{10}$H$_2$O$_3$SCl$_{12}$ and mixtures thereof in sufficient proportion to improve the fire retardancy of the bituminous material, and an antimony compound in sufficient proportion to improve the fire retardancy of the bituminous material.

3. A composition according to claim 1 containing C$_{10}$Cl$_{12}$.

4. A compositon according to claim 1 containing C$_{10}$Cl$_4$F$_8$.

5. A composition according to claim 1 containing C$_{10}$Cl$_{10}$O.

6. A composition according to claim 2 in which the antimony compound is antimony oxide.

7. A fire retardant bituminous composition comprising a bituminous material and a compound selected from the group consisting of C$_{10}$Cl$_{12}$, C$_{10}$Cl$_4$F$_8$, C$_{10}$Cl$_{10}$O, C$_{10}$H$_2$O$_3$SCl$_{12}$ and mixtures thereof in sufficient proportion, up to fifty percent halogen by weight in the bituminous composition, to improve the fire retardancy of the bituminous material.

8. A fire retardant bituminous composition comprising a bituminous material, from about ten to fifty percent by weight of halogen of a compound selected from the group consisting of C$_{10}$Cl$_{12}$, C$_{10}$Cl$_{10}$O, C$_{10}$Cl$_4$F$_8$, C$_{10}$H$_2$O$_3$SCl$_{12}$ and mixtures thereof, and from one to ten percent by weight of antimony oxide, the halogenated compound and antimony oxide being present in sufficient proportion to improve the fire retardancy of the bituminous material.

References Cited in the file of this patent

UNITED STATES PATENTS

| 2,861,012 | Lowell | Nov. 18, 1958 |
| 2,962,464 | Feild | Nov. 29, 1960 |